UNITED STATES PATENT OFFICE.

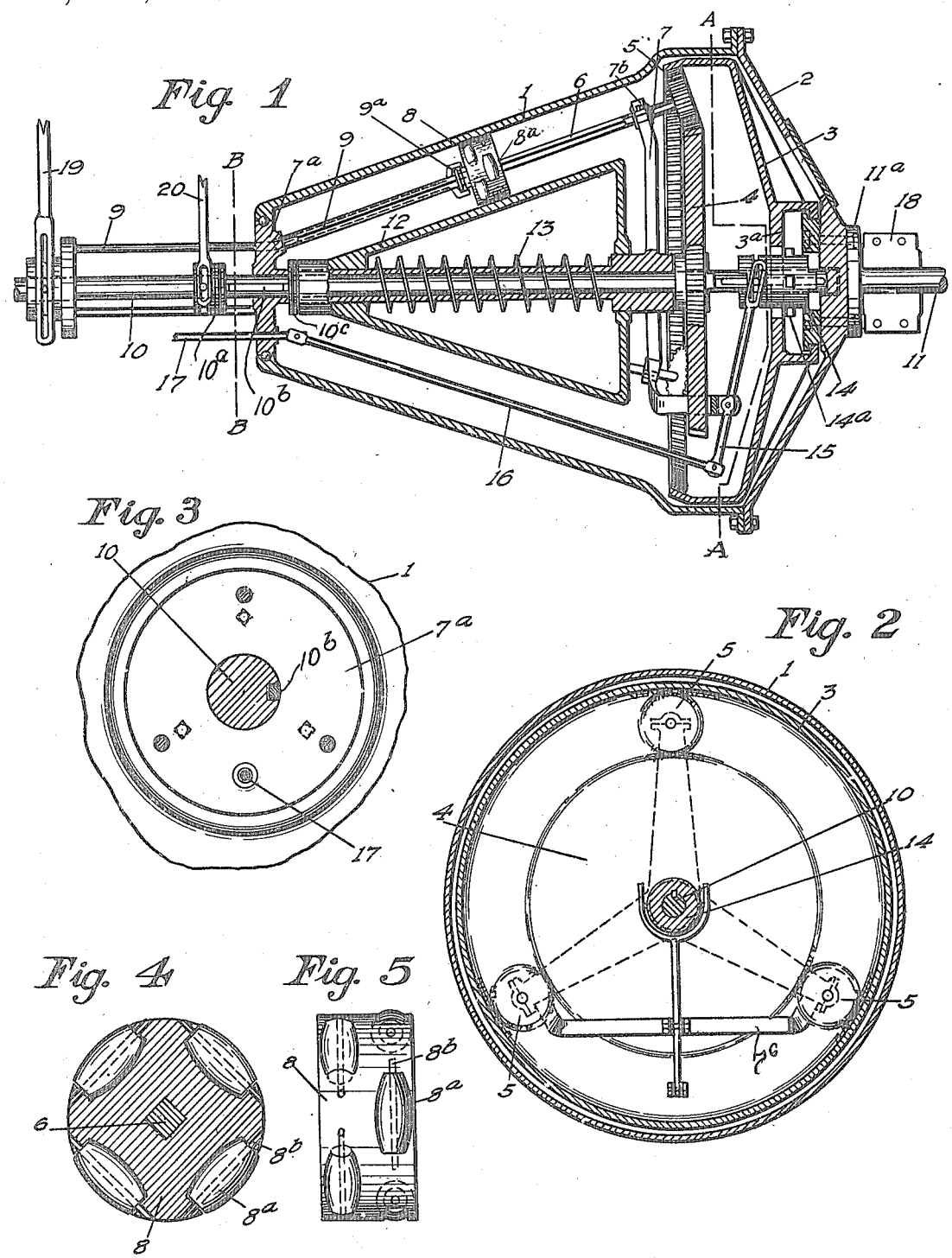

ERVIN E. ROBERTS, OF SAN DIEGO, CALIFORNIA.

POWER-TRANSMISSION MECHANISM.

1,207,216.　　　　Specification of Letters Patent.　　Patented Dec. 5, 1916.

Application filed March 23, 1914.　Serial No. 826,593.

*To all whom it may concern:*

Be it known that I, ERVIN E. ROBERTS, a citizen of the United States, and a resident of San Diego, in the county of San Diego and State of California, have invented certain new and useful Improvements in Power-Transmission Mechanism, of which the following is a specification.

My invention relates to speed changing power transmission mechanism, more particularly applicable to automobiles and other self-propelled vehicles.

The objects of my invention are, first, to provide a mechanism of this class in which the speed may be changed gradually from low to high, or high to low, without shifting the gears or throwing a clutch in or out; second, to provide a device of this class in which a clutch may be used in connection therewith, if desired, in changing the speed; third, to provide a device of this class in which the clutch and transmission are placed in a compact form, fourth, to provide a friction driving mechanism that is efficient in its action, durable, easily lubricated and economical of construction, and fifth, to provide such a device so constructed that the revolving casing may be used as the fly wheel if desired, thus eliminating the necessity of a fly wheel.

With these and other objects in view, as will appear hereinafter, my invention consists of certain novel features of construction, combination and arrangement of parts as will be hereinafter described in detail and particularly set forth in the appended claims, reference being had to the accompanying drawings and to the characters of reference thereon, which form a part of this specification, in which:

Figure 1 is a sectional view of my transmission mechanism complete; Fig. 2 is a sectional view on the line A—A of Fig. 1; Fig. 3 is a sectional view on the line B—B of Fig. 1; Fig. 4 is a sectional view of one of the friction rollers, and Fig. 5 is an elevational view thereof at right angles to Fig. 4.

Similar characters of reference refer to similar parts throughout the several views.

The casing 1, cap 2, internal gear 3, gear 4, pinions 5, square shafts 6, spider 7, friction rollers 8, flexible shafts 9, driven shaft 10, driving shaft 11, friction cone 12, thrust spring 13, clutch 14, clutch operating lever 15, shift rod 16, shift rod 17, bearing 18, and shifting levers 19 and 20, constitute the principal parts of my transmission mechanism.

The casing 1 is in the form of a frustum of a cone, as shown best in Fig. 1, with the small end open. The small end on the inner surface is provided with bearings adapted to engage with the outer surface of the annular piece 7$^a$ and revolve thereon. It is provided on its large end with the cap 2 which is shaped as shown best in Fig. 1. This cap is rigidly secured centrally to a flange 11$^a$ on the end of the main shaft 11. This main shaft 11 is revolubly mounted in a bearing 18. Mounted on the driven shaft 10, inside of the casing 1, is the friction cone 12 adapted to be shifted longitudinally on said shaft 10. The outer surface of this cone 12 is parallel with the inner surface of the casing 1 and it is forced endwise on said shaft by means of a thrust spring 13 tending to crowd the outer surface of this cone 12 toward the inner surface of the casing 1. Between these two surfaces are mounted a plurality of friction rollers 8 as shown best in Figs. 4 and 5. In this case I have shown three, but any number may be used to facilitate the efficiency of the mechanism. They are mounted on the square shafts 6 which connect with the hub of the friction rollers 8 by means of a bifurcated piece on the end of the flexible shaft connecting with said hub forming the joint 9$^a$. These friction rollers 8 are each provided with a plurality of rollers 8$^a$ mounted on the axes 8$^b$. These rollers 8$^a$ are for the purpose of facilitating the shifting of the rollers 8 sidewise between the inner surface of the casing 1 and the outer surface of the cone 12. The square shafts 6 are supported in bearings 7$^b$ at one of their ends on the extended ends of the arm of the spider 7 and at their other ends in bearings in the piece 7$^a$. On the ends of these shafts 6 are mounted pinions 5 which engage with the gear 4 and operate the same. This gear 4 is revolubly mounted on the shaft 10. These pinions 5 also engage with the internal gear 3 which revolves in the opposite direction to the gear 4. This gear 3 is revolubly mounted on the inner portion of the cap 2 which is rigidly secured to the driving shaft 11. The clutch 14 engages, when in one position, with the gear 4, and, in its opposite position, with the cap 2 on the driving shaft 11. The lugs 14$^a$ engage with the gear 3, when in a certain position, and when the lugs 14$^a$ are on opposite sides of portion 3ª of the gear 3, the mechanism is neutral as there is no engagement with the clutch. The clutch is shifted by means of the lever 15 which is pivotally mounted on the bar 7ᶜ secured to the spider 7, and it is connected with the shift rod 16 which in turn is pivotally connected with the shift rod 17, which is mounted in the piece 7ª and is controlled by a lever which extends to, and in reach of, the operator. The friction rollers 8 are shifted by means of the flexible shafts 9 which are shifted by means of the lever 19, which in turn is controlled by a lever in control of the operator of the vehicle, and the cone 12 is shifted longitudinally on the shaft 10 by means of the lever 20 which extends to the operator of the vehicle, and the bearing 10ª which is provided with a bar 10ᵇ which extends to the bearing 10ᶜ which bears against the end of the cone 12, and, when the cone is shifted, pushes the cone 12 against the spring 13, compressing it.

Though I have shown and described a particular construction, combination and arrangement of parts, I do not wish to be limited to this particular construction, combination and arrangement, but desire to include in the purview of my invention, the construction, combination and arrangement substantially as set forth in the appended claims.

It is obvious that with this construction there is provided a transmission mechanism in which the prime operating means is the friction rollers in engagement with the casing 1, which revolves the gears 5, which in turn revolve the gears 3 and 4, which act as forward and reverse motions for the shaft 10, the driven shaft; that the shifting of the friction rollers 8 along the inner surface of the casing 1 change the speed of the shafts 6 which in turn changes the speed of the shaft 10; that there is no shifting of the gears; that the revolution of the casing 1 and the cap 2, if constructed of sufficient weight, will provide means of keeping up the momentum, and thus avoid the necessity of a fly-wheel in connection with the engine; that the casing may be fitted with gaskets making it oil tight and the whole can be run in oil; that if necessary, the cone 12 may be shifted longitudinally before shifting the friction rollers 8, thus relieving the pressure on them; that the operation may be reversed and the shaft 11 be the driven shaft and the shaft 10 the driving shaft.

Having thus described my invention, what I claim as new and desire to secure by Letters Patent, is:

1. A transmission mechanism comprising a driving shaft, a driven shaft, a friction cone secured to the driving shaft, a friction cone rotatable and longitudinally movable on the driven shaft, shafts between the cones and parallel thereto, friction wheels longitudinally movable and non-rotatable on the shafts, means to shift the friction wheels, pinions on the extended ends of the shafts, gears engaging said pinions, clutch elements on the driving shaft and gears and a movable clutch element splined to the driven shaft adapted to engage either of said clutch elements.

2. A transmission mechanism comprising a driving shaft, a driven shaft, a casing rigidly secured to said driving shaft, a cone mounted on said driven shaft adapted to be shifted longitudinally thereon, a plurality of shafts revolubly mounted between said cone and said casing, gears mounted on the extended ends of said shafts, friction rollers engaging with said cone and said casing adapted to be revolved by said casing and to revolve said cone in the opposite direction, a gear revolubly mounted on said driven shaft, a gear revolubly mounted on said driving shaft, both engaging with said first mentioned gears on said shafts, clutch elements on said driving shaft and gears and a movable clutch element splined to the driven shaft adapted to engage either of said clutch elements.

3. A transmission mechanism comprising a driving shaft, a driven shaft, a casing rigidly secured to said driving shaft, a cone mounted on said driven shaft adapted to be shifted longitudinally thereon, a plurality of shafts revolubly mounted between said casing and said cone, gears mounted on the extended ends of said shafts, friction rollers mounted on said shaft engaging with said cone and said casing adapted to be revolved by said casing and to revolve said cone, a gear revolubly mounted on said driven shaft, a gear revolubly mounted on said driving shaft, both engaging with the gears on said shafts, means for shifting said cone, clutch elements on the driving shaft and gears and a movable clutch element splined to the driven shaft adapted to engage either of said clutch elements.

4. A transmission mechanism comprising a driving shaft, a driven shaft, a casing rigidly secured to said driving shaft, a cone mounted on said driven shaft adapted to be shifted longitudinally thereon, shafts revolubly mounted between said cone and said casing, friction rollers mounted on said shafts engaging with the said cone and said casing adapted to be revolved by said casing and to revolve said cone in the opposite direction, a gear revolubly mounted on said driven shaft, a gear revolubly mounted on said driving shaft, gears mounted on said revolubly mounted shafts engaging with both the gears on said driving shaft and said driven shaft, a clutch element for engaging said driven shaft with said driving shaft, clutch elements on said revolubly mounted gears adapted to engage the clutch element on said driven shaft, means for shifting said clutch element and means for shifting said cone.

5. A transmission mechanism comprising a driving shaft, a driven shaft, a casing rigidly secured to said driving shaft, a cone mounted on said driven shaft adapted to be shifted longitudinally thereon, a plurality of shafts revolubly mounted between said casing and said cone, gears rigidly mounted on the extended ends of said shafts, friction rollers mounted on shafts engaging with said cone and said casing adapted to be revolved by said casing and to revolve said cone, a gear revolubly mounted on said driving shaft, engaging with the gears on said shafts mounted between the casing and said cone, a clutch for connecting said driving shaft with said driven shaft and with the gear revolubly mounted on said driving shaft, means for shifting said clutch, means for shifting said cone, and means for shifting said frictional rollers, whereby the speed of the driven shaft is changed relatively to that of the driving shaft.

In testimony whereof, I have hereunto subscribed my name in the presence of two subscribing witnesses.

ERVIN E. ROBERTS.

Witnesses:
ABRAM B. BOWMAN,
ELMER E. RODABAUGH.